(12) United States Patent
Thomas et al.

(10) Patent No.: US 11,590,689 B2
(45) Date of Patent: Feb. 28, 2023

(54) SYSTEMS AND METHODS FOR AN IMPROVED PEEL OPERATION DURING ADDITIVE FABRICATION

(71) Applicant: Formlabs, Inc., Somerville, MA (US)

(72) Inventors: Steven Thomas, Cambridge, MA (US); Yoav Reches, Cambridge, MA (US); Jason Livingston, Somerville, MA (US); Jeffery Morin, Boston, MA (US); Caitlin Reyda, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 108 days.

(21) Appl. No.: 17/181,404

(22) Filed: Feb. 22, 2021

(65) Prior Publication Data
US 2021/0178745 A1 Jun. 17, 2021

Related U.S. Application Data

(62) Division of application No. 16/270,724, filed on Feb. 8, 2019, now abandoned, which is a division of
(Continued)

(51) Int. Cl.
*B29C 64/10* (2017.01)
*B33Y 10/00* (2015.01)
(Continued)

(52) U.S. Cl.
CPC ............ *B29C 64/10* (2017.08); *B29C 64/135* (2017.08); *B29C 64/379* (2017.08); *B33Y 10/00* (2014.12); *B33Y 30/00* (2014.12); *B29K 2833/04* (2013.01)

(58) Field of Classification Search
CPC ............. B29C 67/007; B29C 67/0077; B29C 67/0074; B29C 67/0055; B29C 67/0066;
(Continued)

(56) References Cited

U.S. PATENT DOCUMENTS 9,895,843 B2 2/2018 Lobovsky et al.
10,201,963 B2 2/2019 Thomas et al.
(Continued)

FOREIGN PATENT DOCUMENTS

WO WO 2013/026087 A1 2/2013
WO WO 2014/037826 A1 3/2014
WO WO 2015/072921 A1 5/2015

OTHER PUBLICATIONS

International Search Report and Written Opinion for PCT/US2015/040246 dated Oct. 16, 2015.
(Continued)

*Primary Examiner* — Armand Melendez
(74) *Attorney, Agent, or Firm* — Wolf, Greenfield & Sacks, P.C.

(57) ABSTRACT

According to some aspects, a method of additive fabrication wherein a plurality of layers of material are formed is provided. The method may comprise forming a layer of material in contact with a container, and subsequent to the forming of the layer of material, actively bending the container around at least one fixed point such that the layer of material separates from the container. According to some aspects, an additive fabrication apparatus configured to form a plurality of layers of material is provided. The apparatus may comprise a container, a build platform, one or more force generators, and at least one controller configured to, subsequent to formation of a layer of material in contact with the container, actively bend the container around at least one fixed point via the one or more force generators, such that the layer of material separates from the container.

11 Claims, 13 Drawing Sheets

Related U.S. Application Data application No. 14/462,551, filed on Aug. 18, 2014, now Pat. No. 10,201,963.

(51) Int. Cl.
*B33Y 30/00* (2015.01)
*B29C 64/135* (2017.01)
*B29C 64/379* (2017.01)

(58) Field of Classification Search
CPC ............ B29C 67/0085; B29C 67/0092; B29C 67/0096; B29C 67/0088; B29C 67/0081; B29C 67/00621; B29C 2035/0827; B29C 2035/0211; B29C 2035/0811; B29C 2035/0833; B29C 2035/0855; B29C 35/0805; B29C 35/0888; B29C 35/02; B29C 31/02; B29C 31/44; B29C 33/0055; B29C 33/68; B29C 37/0007; B29C 37/0014; B29C 37/0075
See application file for complete search history.

(56) References Cited

U.S. PATENT DOCUMENTS

| | | | |
|---|---|---|---|
| 10,213,966 | B2 | 2/2019 | FrantzDale |
| 10,369,747 | B2 | 8/2019 | Lobovsky |
| 10,780,629 | B2 | 9/2020 | FrantzDale |
| 10,926,457 | B2 | 2/2021 | Lobovsky |
| 2008/0174050 | A1 | 7/2008 | Kikuchi |
| 2013/0292862 | A1 | 11/2013 | Joyce |
| 2014/0085620 | A1 | 3/2014 | Lobovsky et al. |
| 2014/0170591 | A1 | 6/2014 | El-Siblani |
| 2014/0191442 | A1 | 7/2014 | Elsey |
| 2015/0064298 | A1 | 3/2015 | Syao |
| 2015/0183168 | A1 | 7/2015 | Liverman et al. |
| 2015/0231828 | A1 | 8/2015 | El-Siblani et al. |
| 2016/0016361 | A1 | 1/2016 | Thomas et al. |
| 2016/0046080 | A1 | 2/2016 | Thomas et al. |
| 2016/0052205 | A1 | 2/2016 | FrantzDale |
| 2016/0129645 | A1 | 5/2016 | Wighton et al. |
| 2018/0133973 | A1 | 5/2018 | Lobovsky et al. |
| 2019/0240968 | A1 | 8/2019 | Thomas et al. |
| 2019/0291344 | A1 | 9/2019 | FrantzDale |
| 2019/0322053 | A1 | 10/2019 | Lobovsky et al. |

OTHER PUBLICATIONS

International Preliminary Report on Patentability for International Application No. PCT/US2015/040246 dated Jan. 26, 2017.

Extended European Search Report for European Application No. 15822762.9 dated Feb. 20, 2018.

[No. Author Listed] Evidence of on sale prior to Dec. 2013. Obtained from the internet at the following address http://forum.formlabs.com/t/tray-tilt-didnt-come-back-to-level/728.

Fichter, A Stewart Platform-Based Manipulator: General Theory and Practical Construction, The International Journal of Robotics Research, Jun. 1986, vol. 5, No. 2, pp. 157-182.

Kohli et al., Manipulator Configurations Based on Rotary-Linear (R-L) Actuators and Their Direct and Inverse Kinematics, ASME Journal of Mechanisms, Transmissions, and Automation in Design, 1988, vol. 110, pp. 397-404.

Liu et al., Kinematic Analysis of a Stewart Platform Manipulator, IEEE Transactions on Industrial Electronics, Apr. 1993, vol. 40, No. 2, pp. 282-293.

Nanua et al., Direct Kinematic Solution of a Stewart Platform, IEEE Transactions on Robotics and Automation, Aug. 1990, vol. 6, No. 4, pp. 438-444.

Pierrot et al., DELTA: A Simple and Efficient Parallel Robot, Robotica, 1990, vol. 8, pp. 105-109.

Pierrot et al., Towards a Fully Parallel 6 DOF Robot for High-Speed Applications, 1991, Proc. of the IEEE International Conference on Robotics and Automation, pp. 1288-1293.

Stewart, A Platform with Six Degrees of Freedom, Proc. Institute of Mechanical Engineering, London, England, 1965, vol. 180, pp. 371-386.

Zhou et al., Digital material fabrication using mask-image-projection-based stereolithography. Rapid Prototyping J; (2013) vol. 19, No. 3: pp. 153-165.

Song et al., Development of a low-cost parallel kinematic machine for multi-directional additive manufacturing. 24th International SFF Symposium—An Additive Manufacturing Conference. 2013. 297-310.

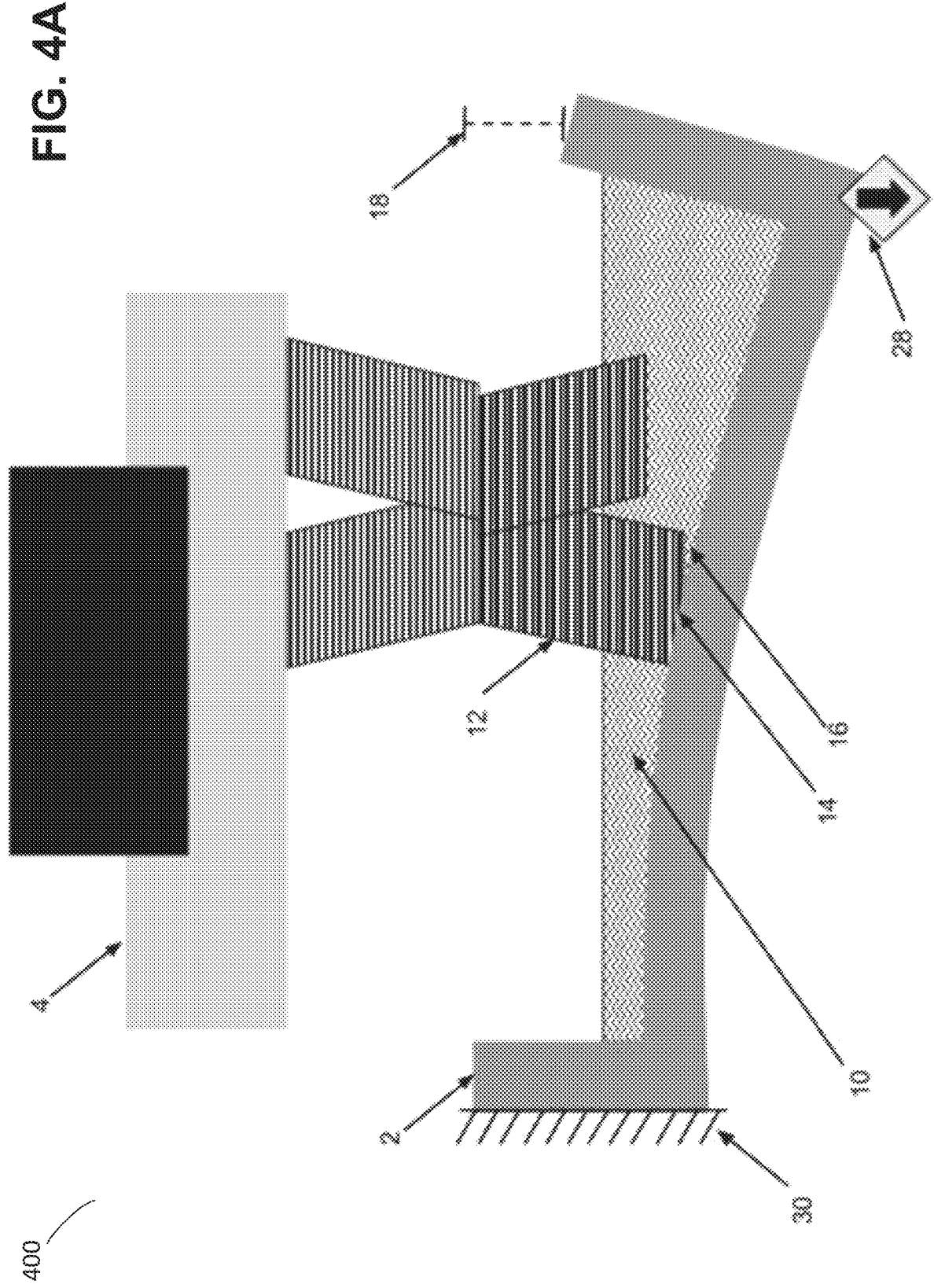

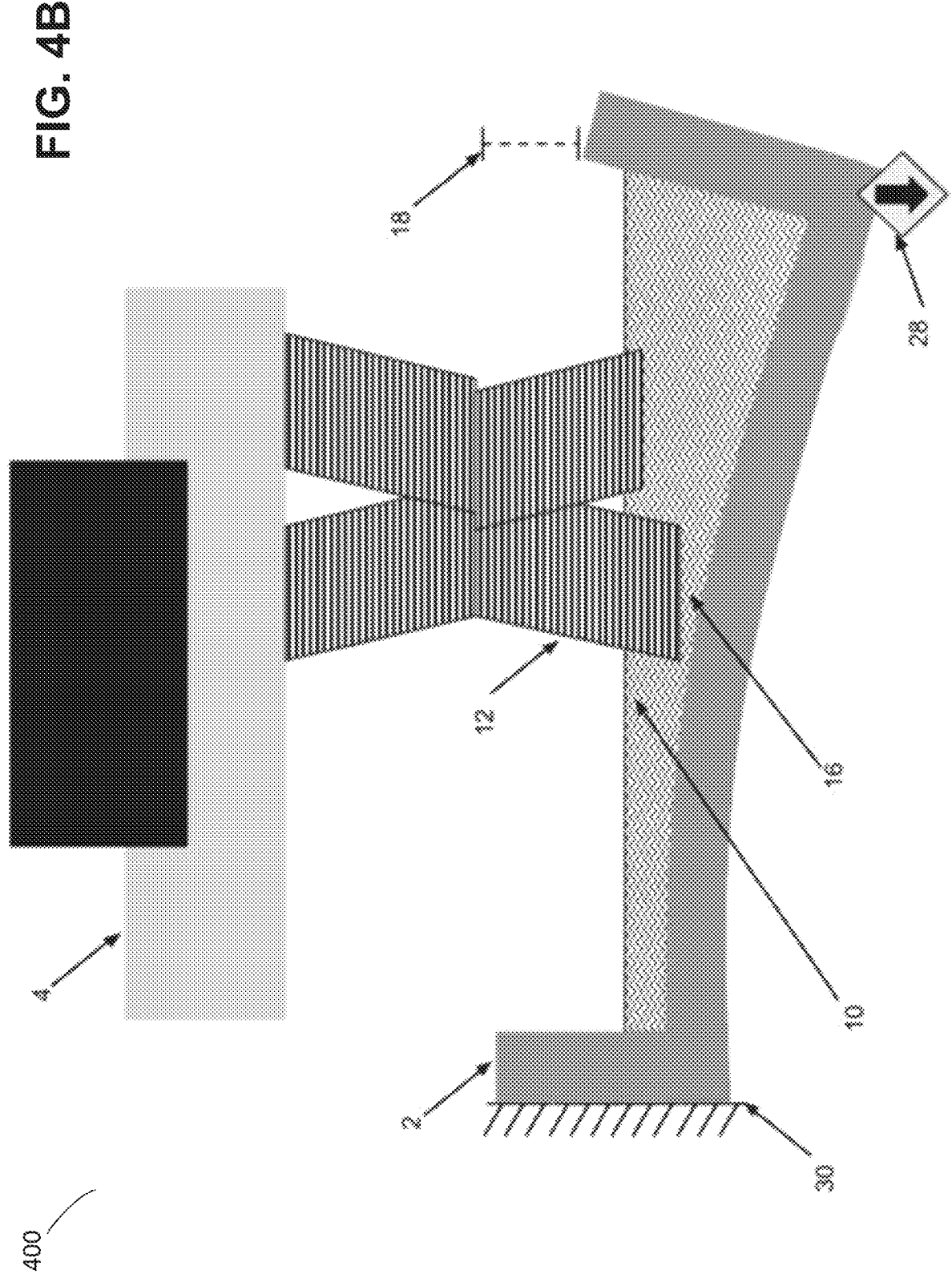

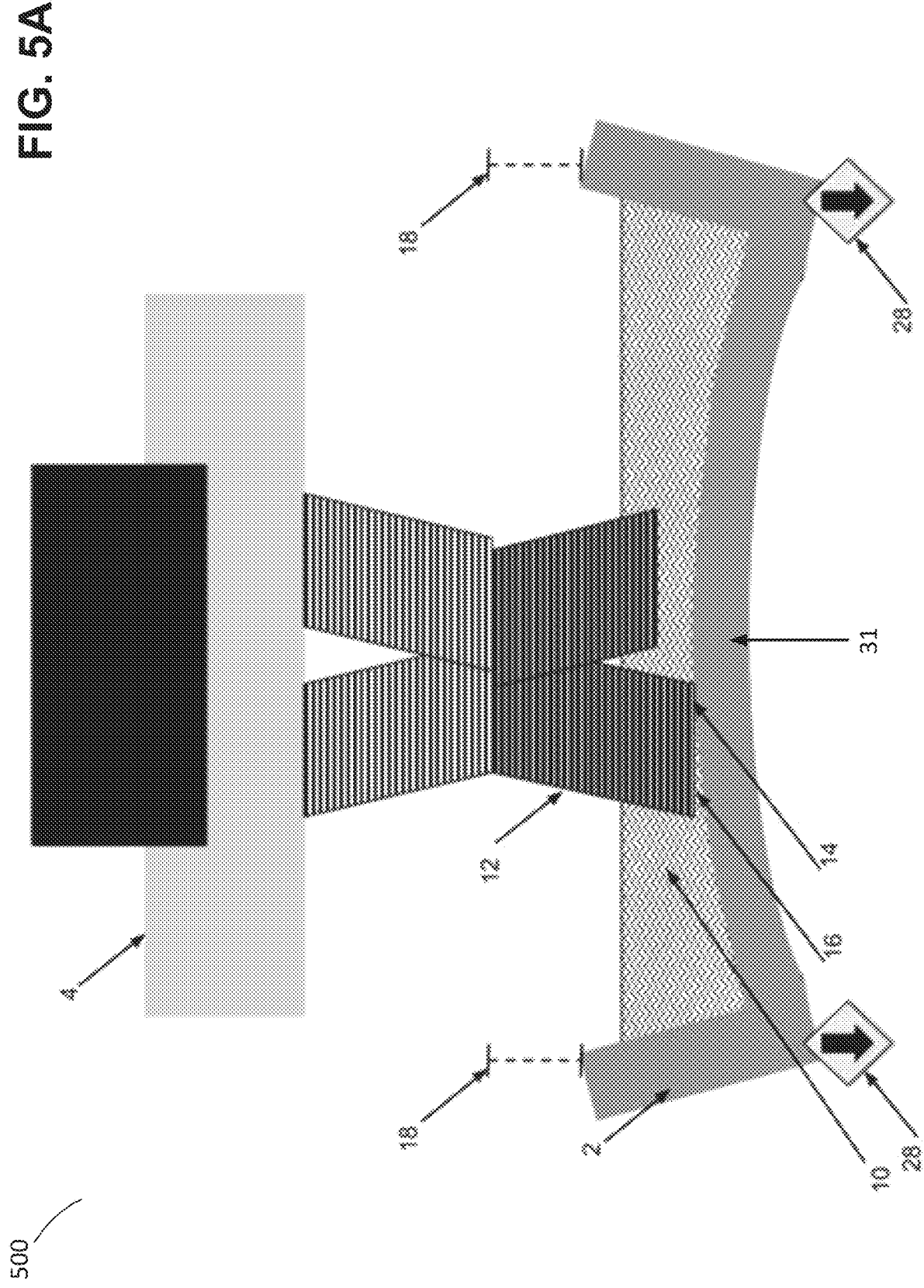

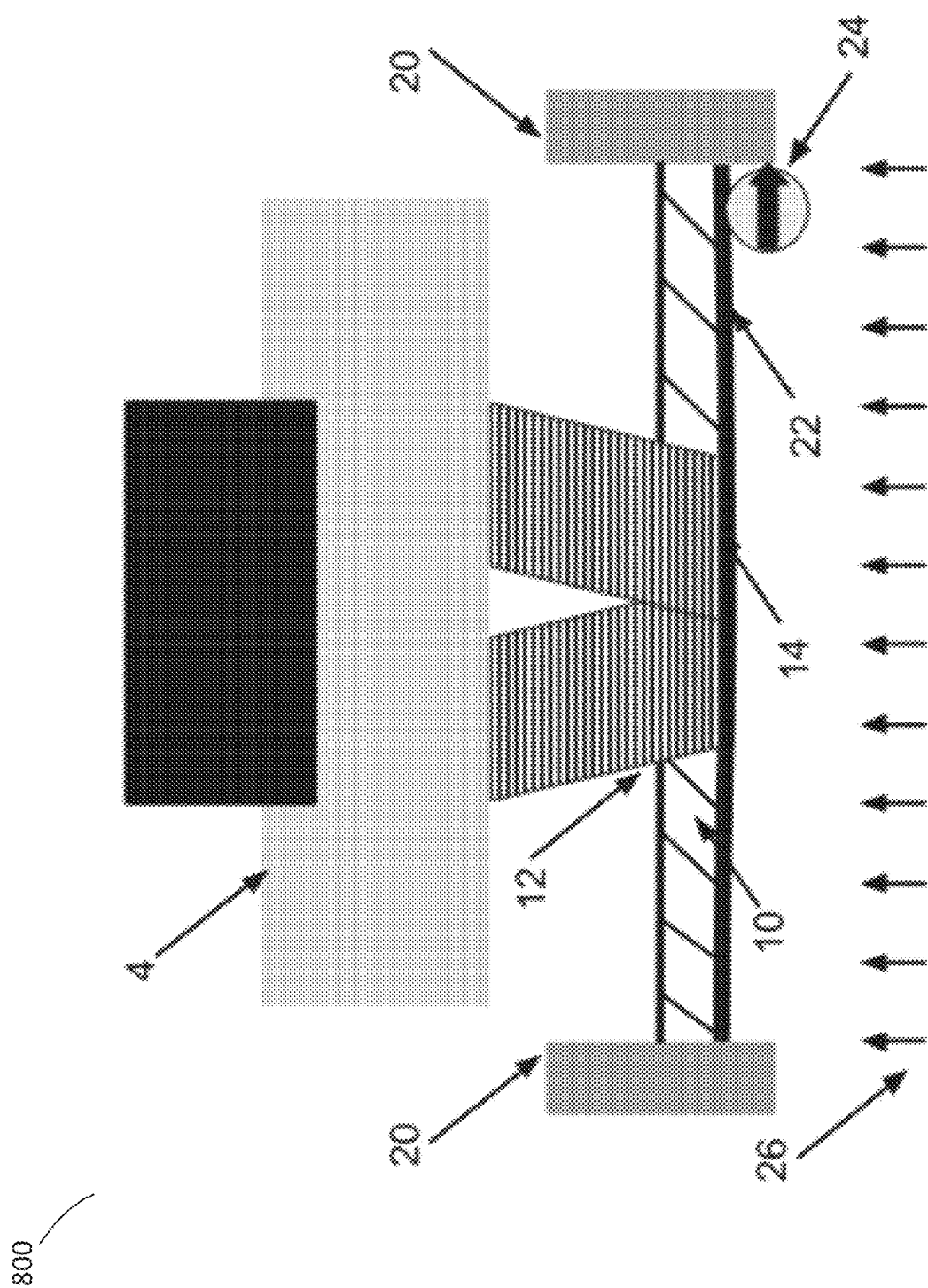

SYSTEMS AND METHODS FOR AN IMPROVED PEEL OPERATION DURING ADDITIVE FABRICATION

RELATED APPLICATIONS

This application is a divisional of U.S. application Ser. No. 16/270,724, filed Feb. 8, 2019, which is a divisional of U.S. application Ser. No. 14/462,551 (now U.S. Pat. No. 10,201,963), filed Aug. 18, 2014, each of which is hereby incorporated by reference in its entirety.

FIELD OF INVENTION

The present invention relates generally to systems and methods for separating a part from a surface during additive fabrication, e.g., 3-dimensional printing.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or the bottom surface of the build platform.

SUMMARY

Systems and methods for separating a part from a surface during additive fabrication are provided.

Some embodiments include a method of additive fabrication wherein a plurality of layers of material are formed on a build platform, comprising forming a layer of material in contact with a container, and operating, subsequent to the forming of the layer of material, one or more force generators coupled to the container to apply a force to a portion of the container, thereby actively bending the container around at least one fixed point such that the layer of material separates from the container.

Some embodiments provide at least one computer readable medium comprising instructions that, when executed, perform a method of additive fabrication wherein a plurality of layers of material are formed on a build platform, the method comprising forming a layer of material in contact with a container, and operating, subsequent to the forming of the layer of material, one or more force generators coupled to the container to apply a force to a portion of the container, thereby actively bending the container around at least one fixed point such that the layer of material separates from the container.

The foregoing summary is provided by way of illustration and is not intended to be limiting.

BRIEF DESCRIPTION OF DRAWINGS

The accompanying drawings are not intended to be drawn to scale. For purposes of clarity, not every component may be labeled in every drawing. In the drawings:

FIGS. 4A-B depict a first exemplary additive fabrication device configured to separate a part from a surface by bending the surface, according to some embodiments;

FIGS. 5A-B depict a second exemplary additive fabrication device configured to separate a part from a surface by bending the surface, according to some embodiments;

FIG. 8 depicts application of pressure to a stereolithographic printer utilizing a thin film, according to some embodiments;

DETAILED DESCRIPTION

Systems and methods for separating a part from a surface during additive fabrication are provided. As discussed above, in additive fabrication a plurality of layers of material may be formed on a build platform. In some cases, one or more of the layers may be formed so as to be in contact with a surface other than another layer or the build platform. For example, stereolithographic techniques may form a layer of resin so as to be in contact with an additional surface such as a container in which liquid resin is located.

Figure 1:
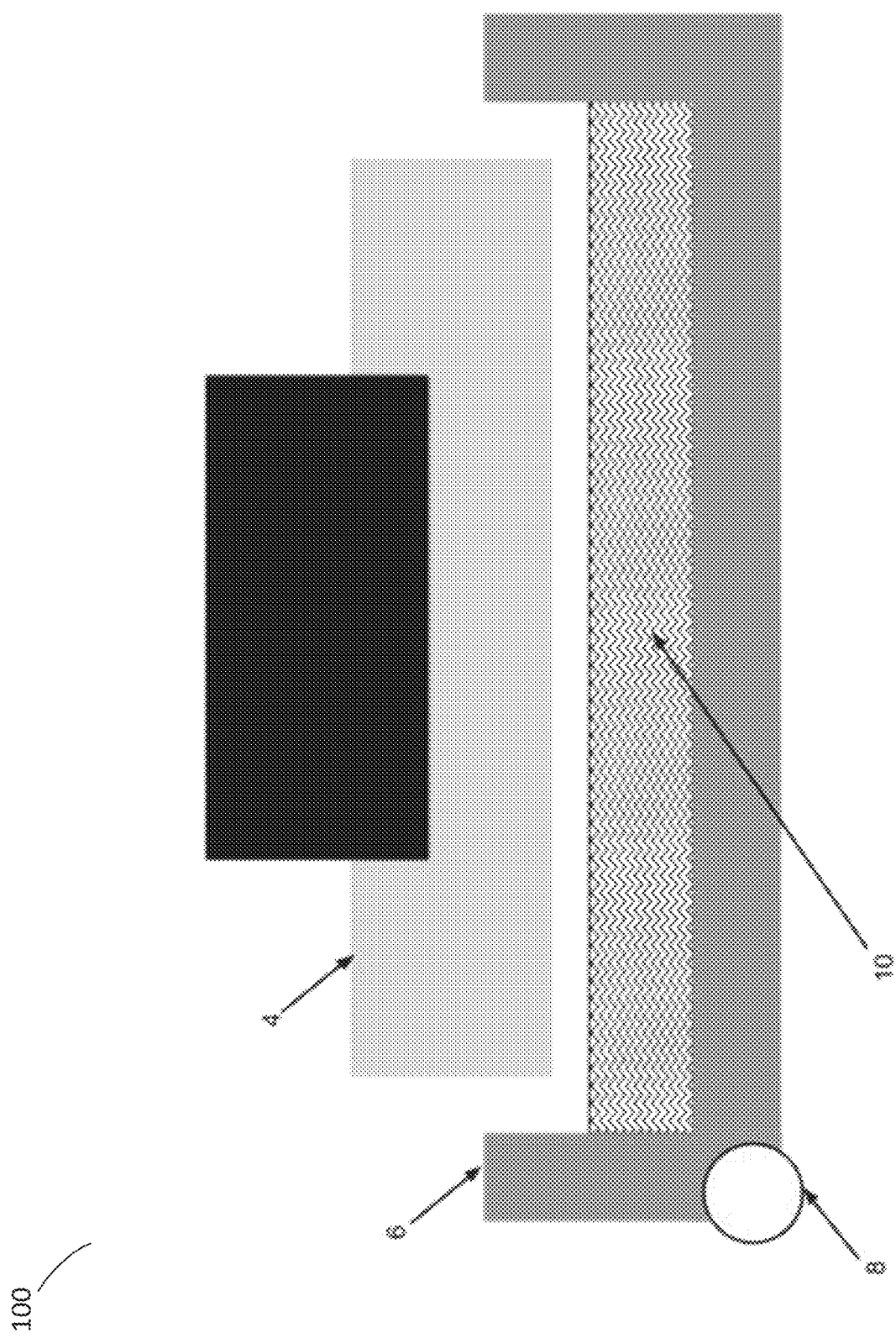
FIG. 1 provides a schematic view of a stereolithographic printer, according to some embodiments.
Figure 2:
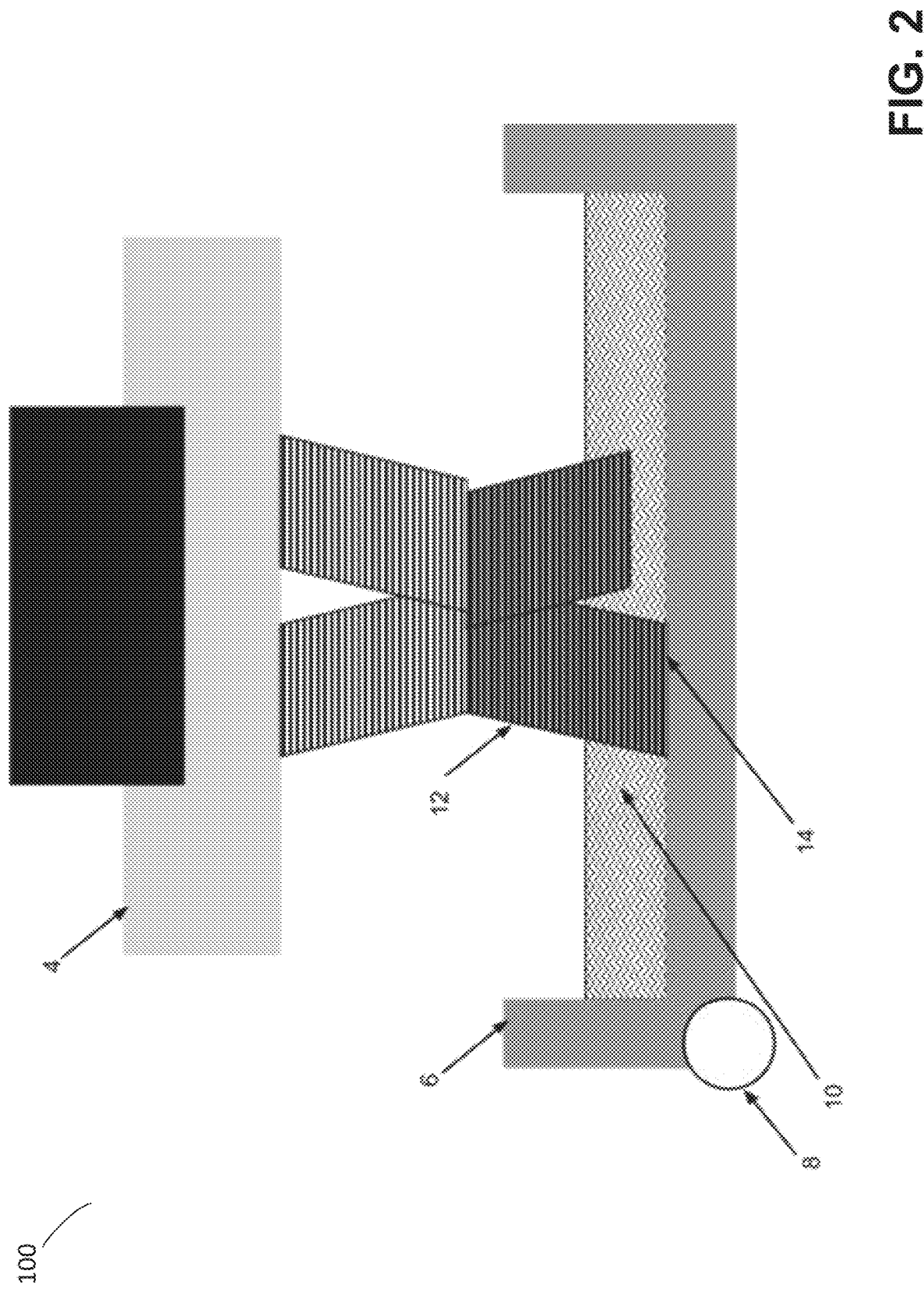
FIG. 2 provides a schematic view of a stereolithographic printer having formed a plurality of layers of a part, according to some embodiments.

To illustrate one exemplary additive fabrication technique in which a part is formed in contact with a surface other than another layer or the build platform, an inverse stereolithographic printer is depicted in FIGS. 1 and 2. Exemplary stereolithographic printer 100 forms a part in a downward facing direction on a build platform such that layers of the part are formed in contact with a surface of a container in addition to a previously cured layer or the build platform. In the example of FIGS. 1 and 2, stereolithographic printer 100 comprises build platform 4, container 6, axis 8 and liquid resin 10. A downward facing build platform 4 opposes the floor of container 6, which is filled with a photopolymer resin 10. FIG. 1 represents a configuration of stereolithographic printer 100 prior to formation of any layers of a part on build platform 4.

As shown in FIG. 2, a part 12 may be formed layerwise, with the initial layer attached to the build platform 4. The container's floor may be transparent to actinic radiation, which can be targeted at portions of the thin layer of liquid photocurable resin resting on the floor of the container.

Exposure to actinic radiation cures a thin layer of the liquid resin, which causes it to harden. The layer 14 is at least partially in contact with both a previously formed layer and the surface of the container 6 when it is formed. The top side of the cured resin layer typically bonds to either the bottom surface of the build platform 4 or with the previously cured resin layer in addition to the transparent floor of the container. In order to form additional layers of the part subsequent to the formation of layer 14, any bonding that occurs between the transparent floor of the container and the layer must be broken. For example, one or more portions of the surface (or the entire surface) of layer 14 may adhere to the container such that the adhesion must be removed prior to formation of a subsequent layer.

Figure 3:
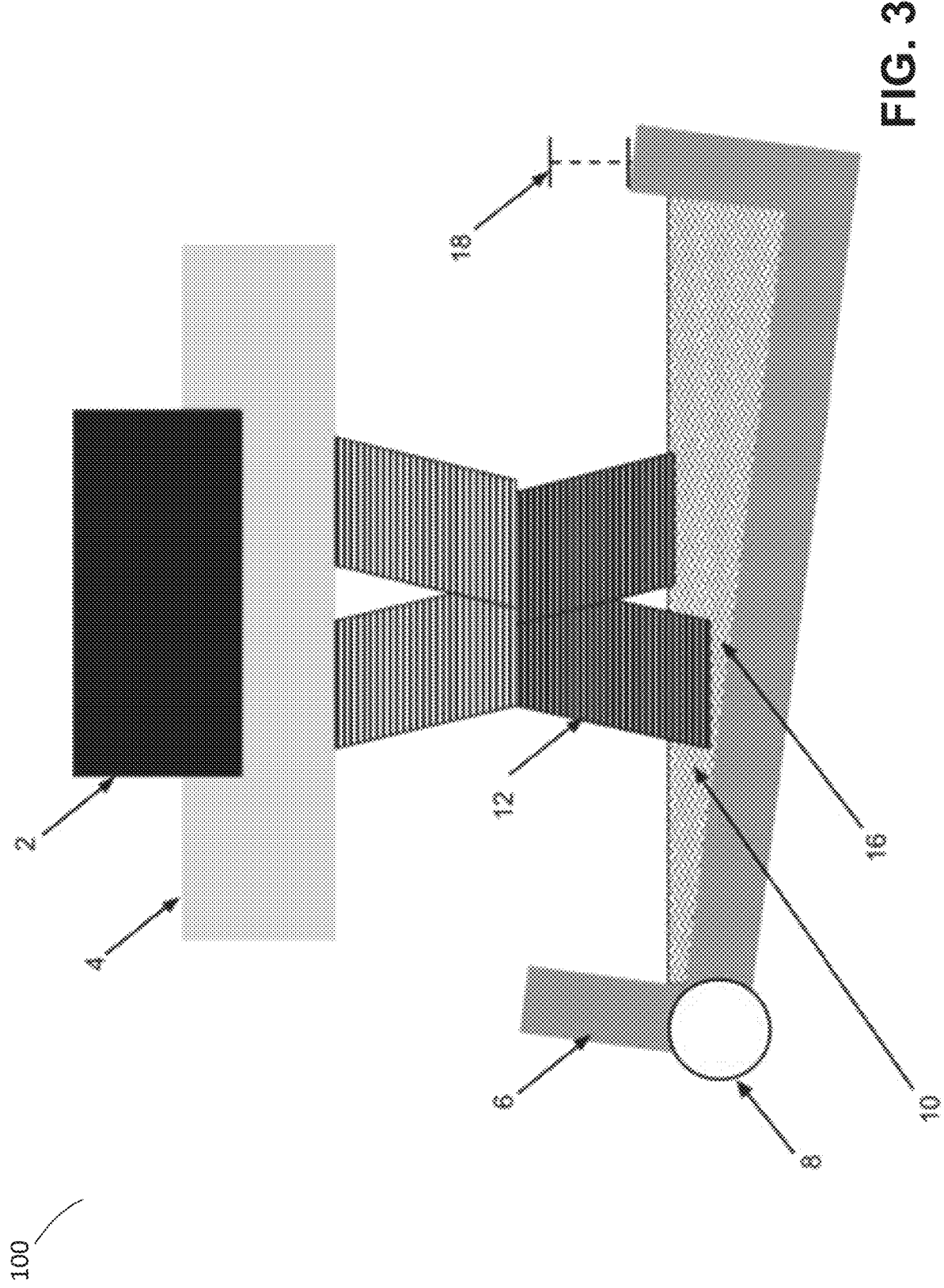
FIG. 3 illustrates a mechanical operation for separating a part from a surface of a stereolithographic printer, according to some embodiments.

Techniques for reducing the strength of this bond may include inhibiting the curing process or providing a highly smooth surface on the inside of the container. In many use cases, however, at least some force must be applied to remove the cured resin layer from the container floor. For example, a force may be applied by rotating the container to mechanically separate the container from the part 12. FIG. 3 depicts exemplary stereolithographic printer 100 separating a part from the container by pivoting the container 6 about a fixed axis 8 on one side of the container, thereby displacing an end of the container distal to the fixed axis a distance 18 (which may be any suitable distance). This step involves a rotation of the container 6 away from the part 12 to separate layer 16 from the container, which may be followed by a rotation of the container back towards the part. In addition, the build platform 4 may move away from the container to create a space for a new layer of liquid resin to form between the part and the container. Subsequent to this motion, a new layer of liquid resin is available for exposure and addition to the part being formed. Each step of the aforementioned curing and separating processes may continue until the part is fully created. By progressively separating the part and the container base, such as in the steps described above, the peak force and/or total force necessary to separate the part and container may be minimized.

However, multiple problems may arise due to the application of force during the above-described processes. For example, in some use cases a force may be applied to and/or through the part itself. A force applied to the part may, in some use cases, cause the part to separate from the build platform, rather than the container, which may disrupt the fabrication process. In some use cases, a force applied to the part may cause deformation or mechanical failure of the part itself.

The inventors have recognized and appreciated that the above-described problems with the separation processes may be reduced by minimizing forces applied to the part by applying such forces gradually and/or evenly to the part. While a higher force may provide fast separation of the part and the container, it may run a greater risk of deforming the part. A lower force, in contrast, may produce a more precise printed part with lower risk of deformation. By applying force gradually to a part, such as by performing a "peeling" process in which the force gradually increases over time and/or is maintained at a lower force on the part for a longer time, the part may be separated from the container using a minimal amount of force. Alternatively, or additionally, applying force evenly to a part may minimize the force applied to each region of the part. For example, force applied to a part may cause a large force to be applied to a particular localized region of the part, e.g., due to the geometry of that region and a smaller force to be applied to the remainder of the part. This may result in the localized region being deformed or otherwise negatively impacted by the large force. By instead applying force evenly to the part, deformation of one or more regions of the part due to higher localized forces acting in the regions may be avoided.

"Separation" of a part from a surface, as used herein, refers to the removal of adhesive forces connecting the part to the surface. It may therefore be appreciated that, as used herein, a part and a surface may be separated via the techniques described herein, though immediately subsequent to the separation may still be in contact with one another (e.g., at an edge and/or corner) so long as they are no longer adhered to one another.

The inventors have further recognized and appreciated that performing a peel by bending the container may provide a way to apply separation forces gradually and/or evenly to a part. Bending of the surface of the container may naturally minimize forces applied to the part since a container that is curved relative to the region of contact between the part and a surface may provide the gradual and/or even application of force that aids the minimization of force.

In some embodiments, performing a peel includes bending a container. Bending the container may result in a more gradual and/or even peel, as discussed above, relative to a peel operation in which the container is, for example, kept rigid and rotated. The container may be bent in any suitable way, including around any number of fixed points, such that the part separates from the container while the fixed points remain in place and such that the container does not rotate around the fixed points. For example, the container may be pulled down (e.g., away from the build platform) while one or more points of the container are fixed, such that a layer of a part in contact with the container is gradually peeled from the container. Bending the container may provide a more gradual peel of a layer with forces more evenly applied to the part compared to a peel operation that rotates the container (e.g., exemplary stereolithographic printer 100 shown in FIG. 3, and discussed above). In some use cases, the container is bent such that its curvature increases. For example, in some use cases the container may be bent from a flat, or substantially flat, configuration into a convex or concave configuration.

In some embodiments, one or more fixed points of the container around which a container is bent are formed by mechanical fastening and/or by adhering those fixed points such that the container does not move and/or rotate about those points. For example, one or more points of a container may be attached to a frame (e.g., via one or more fasteners, via one or more adhesives and/or otherwise) so that a force applied to another region of the container may cause at least part of the container to bend while the fixed point or points remain in place.

In some embodiments, bending of a container is achieved through active means, such as by using one or more force generators to actively push and/or pull regions of the container. The one or more force generators may be coupled to any suitable mechanism or mechanisms such that activation of a force generator causes a force to be applied to one or more points of the container. In some embodiments, active bending of the container is performed via one or more actuators, such as motors (e.g., stepper motors). The one or more actuators may be controlled by any number of suitable controllers, including one or more general purpose processors, Application Specific Integrated Circuits (ASICs), Field-Programmable Gate Arrays (FPGAs) and/or combinations thereof. Bending via active means may reduce forces transmitted to the part compared with passive means, such as by causing the container to bend via motion of the build platform (i.e., so that the adhesive forces between the build platform, part and container cause the container to bend). By using active means to apply a force to a region of the container that is not close, or adjacent, to a layer of a part in contact with the container, compressive forces that might otherwise be applied to the part may be reduced.

In some embodiments, the build platform may move during a peel operation in addition to bending of the container. Moving the build platform may, in some use cases, aid separation of the part from the container. For example, the build platform may be moved toward the container while the container is being bent, thereby further reducing forces applied to one or more regions of the part. The build platform may be moved simultaneously with the bending of the container and/or subsequent to bending being completed. Where the container is bent through active means, as described above, movement of the build platform may provide an additional mechanism with which to control forces applied to a part in contact with the container. For example, separation of a part from a container performed solely by moving the build platform upwards can only be adjusted by altering the speed of the build platform. In contrast, separation performed using active means in addition to the movement of the build platform may adjust the relative speed and timing of the two motions, thus providing greater control over the forces during separation.

In some embodiments, the container may be rotated during a peel operation in addition to bending of the container. Rotating the container may, in some use cases, aid separation of the part from the container. For example, the container may be rotated away from the build platform while the container is being bent, thereby further reducing forces applied to one or more regions of the part. The container may be rotated simultaneously with the bending of the container and/or subsequent to bending being completed.

As discussed above, the container may be bent around one or more fixed points. In some embodiments, the one or more fixed points include an end of the container. For example, an end of the container may be kept substantially fixed while one or more forces are applied to one or more portions of the container, thereby causing the container to bend. An end of the container may, for example, include a point at which a bottom surface of the container meets a side surface of the container (of which there may be multiple such points). Motion of the portion or portions of the container may be in any direction, such as upwards (e.g., towards the build platform) and/or downwards (e.g., away from the build platform). In some embodiments, the container is bent around one or more fixed points in proximity to a part that is in contact with the container. This may reduce forces applied to the part by simultaneously peeling two sides of the layer away from the container.

In some embodiments, the container comprises a material that is able to be repeatedly elastically deformed without premature failure. As discussed above, the container may hold a fabrication material, such as a liquid photopolymer, and provide a substantially flat surface on which to form a layer of a part. Accordingly, the container should generally be sufficiently rigid to perform these functions. However, in order to bend a sufficient amount to separate a part from the container, the container may also have some flexibility. A non-limiting list of exemplary materials from which the container may be formed include one or more polymeric materials, such as Polyethylene Terephthalate (PET), Low-Density Polyethylene (LDPE), High-Density Polyethylene (HDPE), Poly(methyl methacrylate) (PMMA), Polydimethylsiloxane (PDMS), Polyvinyl Chloride (PVC), Polypropylene (PP), and/or any acrylic plastic. In some embodiments, the inventors have found that appropriate materials for the container have a stiffness such that the container deflects a distance between 10-50 mm with an application of force between 5-25 N. Alternatively, or additionally, in some embodiments a suitable container may be capable of substantial deflection with a peak strain of no more than 5-10%, and preferably less than 5%.

Subsequent to the part being separated from the container, the container and/or build platform may move in preparation for a subsequent layer of the part being formed. This movement may be a reverse motion of the motion used to separate the part from the container, though may alternatively be a different motion. In embodiments in which the container and part both move, any flexure and/or motion of the container subsequent to the separation of the container and part may, or may not, be coordinated in the manner described above for bending the container. For example, it may be beneficial to move the container and/or part to a new position in preparation for forming a new layer of the part more rapidly than the motion used to separation the container from the part, e.g., to reduce the total time needed to form the part.

Additional improvements may be readily implemented to reduce peel speed and/or to limit the maximum and/or overall force applied. In some embodiments, a force generator may be modified to apply force in a non-linear fashion, for example through a guide channel which shapes the direction of the force applied. Additionally, or alternatively, a force generator may apply a force at an angle offset from the normal of the container's surface. In some embodiments, the container may be formed with a non-uniform bottom container thickness such that the bottom thickness increases further away from the force generator. Such differential stiffness may advantageously require a higher force to be applied in order to deflect the far side of the container (the side furthest from the force generator). This requirement of a higher force may effectively maintain adhesion of the far side of the part to the container as the peel begins at the edge near the force generator. In some embodiments, the acrylic resin container may be pre-tensioned such that an initial configuration of the container is deflected towards the build platform. Such a configuration may tend to counteract downward forces caused by the weight of the resin and the downward force of the build platform so that the container and the platform are parallel during the fabrication phase. In the absence of such a configuration, the downward force of the build platform during fabrication could cause the container to curve and create a non-uniform print thickness.

In some embodiments, part or the entire floor of the container is formed from a thin film. Using a flexible, thin film as at least part of the floor of the container may decrease the overall force applied to a part being formed by allowing a peeling edge to propagate inward from most or all of the outer edge of the contact area between the part and the film, rather than from a discrete number of sides. The thin film may be configured to behave like a thin sheet, rather than a flexible beam as described above. The thin film may be separated from the part via active and/or passive means. For example, an active means may pull on the thin film to initiate and/or propagate a peeling edge. Alternatively, or additionally, a passive means, such as a motion of the build platform, may be performed to initiate and/or propagate peeling of the film from the part.

Following below are more detailed descriptions of various concepts related to, and embodiments of, systems and methods for separating a part from a surface during additive fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although the embodiments herein are primarily disclosed with respect to the Form 1 3D Printer sold by Formlabs, Inc., the Assignee of the present application, and with respect to stereolithography, the techniques described herein may be equally applicable to other systems. In some embodiments, structures fabricated via one or more additive fabrication techniques as described herein may be formed from, or may comprise, a plurality of layers. For example, layer-based additive fabrication techniques may fabricate an object by formed a series of layers, which may be detectable through observation of the object, and such layers may be any size, including any thickness between 10 microns and 500 microns. In some use cases, a layer-based additive fabrication technique may fabricate an object that includes layers of different thickness.

Although particular systems and methods for separating a part from a surface during additive fabrication have been described and shown herein, it is envisioned that the functionality of the various methods, systems, apparatus, objects, and computer readable media disclosed herein may be applied to any now known or hereafter devised additive fabrication technique wherein it is desired to separate a part from a surface during fabrication.

As discussed above, the inventors have recognized and appreciated that multiple problems may arise due to the application of force during the peeling process described above and depicted in FIG. 3. In particular, as shown in FIG. 3, forces applied to the part during rotation of the container may be undesirable, as they may lead to increased part distortion and/or failure.

FIGS. 4A-B depict an exemplary additive fabrication device configured to separate a part from a surface by bending the surface, according to some embodiments. Exemplary inverse stereolithographic printer 400 includes a flexible container 2 located opposite to build platform 4. The flexible container 2 contains uncured photopolymer resin 10. Attached to the build platform 4 is a part 12, which in the example of FIG. 4A comprises a number of layers formed by additive fabrication including a first layer at which the part is attached to the build platform. A force generator 28 is affixed to one edge of the container, while the other end of the container 30 is fixed in place relative to the build platform. As the flexible container 2 bends downward, a separation edge or mechanical peel 16 initiates. The flexible container 2 comprises one or more flexible materials, examples of which are described above.

As shown in the example of FIG. 4A, one side of the flexible container 2 is fixed while the opposing side of the flexible container is coupled to a force generator 28. A force generated by force generator 28 may be generated in any suitable way, such as with a stepper motor. When the force generator is activated, the flexible nature of the container combined with the fixed end 30 allows the container to deflect or bend, as shown in FIG. 4A, instead of pivoting as shown in FIG. 3. In the example of FIG. 4A, as the floor of the flexible container bends downward, the build platform 4 remains stationary. The bending of container 2 may, in some use cases, be considered analogous to the bending of a loaded cantilever beam.

In the example of FIG. 4A, adhesive forces between the part 12 and the floor of the flexible container 2 may initially resist the deflection of the container floor. As such, the part 12 may tend to exert an upward pull on the flexible container 2 through the adhered cured resin layer 14. The force generator 28, however, continues to exert a downwards force on the flexible container 2 along one side, thus deflecting the flexible container 2. As the flexible container 2 is deflected, force exerted on the part 12 through the adhered layer 14 tends to increase. As the force builds, it eventually becomes great enough to overcome the adhesion force on the edge of the part 12 proximal to the force generator. The layer of the part in contact with the container 14 may then begin to separate or "peel" from the container at a "leading" edge 16. A void created at the leading edge may begin to fill with resin and the peel propagates across the part 12 until the part 12 is fully separated from the flexible container 2. Once the part is separated from the container as shown in FIG. 4B, the build platform 4 may move upward with the part. The flexible container 2 then returns to a position parallel to the build platform 4 and the part 12. The upward motion refreshes and replaces the layer of uncured resin 10 and the next layer of the build can progress. Each step of the aforementioned curing and peeling processes may then continue until the part is fully created.

As discussed above, some embodiments may advantageously provide for a more gradual separation of a part from a surface than techniques described above, and/or may advantageously lower the force needed to perform said separation. With a slower application of a peel force, a part may separate with lower peak forces and less distortion overall because the peel is able to progress more gradually across the part.

Some embodiments may achieve one or more of the above advantages by maintaining adhesion between a part and the surface. For example, as shown in FIGS. 4A-B, a peel may initially propagate from an edge of the part proximal to a force generator 28. Because container 2 is flexible, it is partially kept in place by the upward pull of the forces provided by the adhered layer 14. In contrast, in the exemplary system of FIG. 3, the separation would tend to occur globally across the layer since the magnitude of the attachment force in relation to a force needed to elastically deform the beam is trivial. Therefore, once the peel is initiated, a non-flexible container such as that shown in the example of FIG. 3 would continue to separate downward globally in the fixed pivot motion as shown. In the flexible container system depicted in FIGS. 4A-B, however, because one end of the container is fixed, the beam will bend and the curvature will be greatest towards the fixed edge 30. Stated otherwise, near the fixed edge the beam will remain flat for the longest period and thereby facilitate the adherence of cured resin 14 on the far side of the part 12 to the container floor while the separation progresses.

While the overall and maximum separation forces may be reduced in the example of FIGS. 4A-B, in some use cases the forces may still be non-uniform across the part 12. This non-uniformity in the applied force may be undesirable as it may lead to increased part distortion and/or failure. Since the curvature of the floor of the container is greatest near the fixed edge 30, the peel may progress slowest at that edge. Accordingly, areas of the part 12 closer to the force generator 28 may have increased part distortion and failure.

Figure 5B:
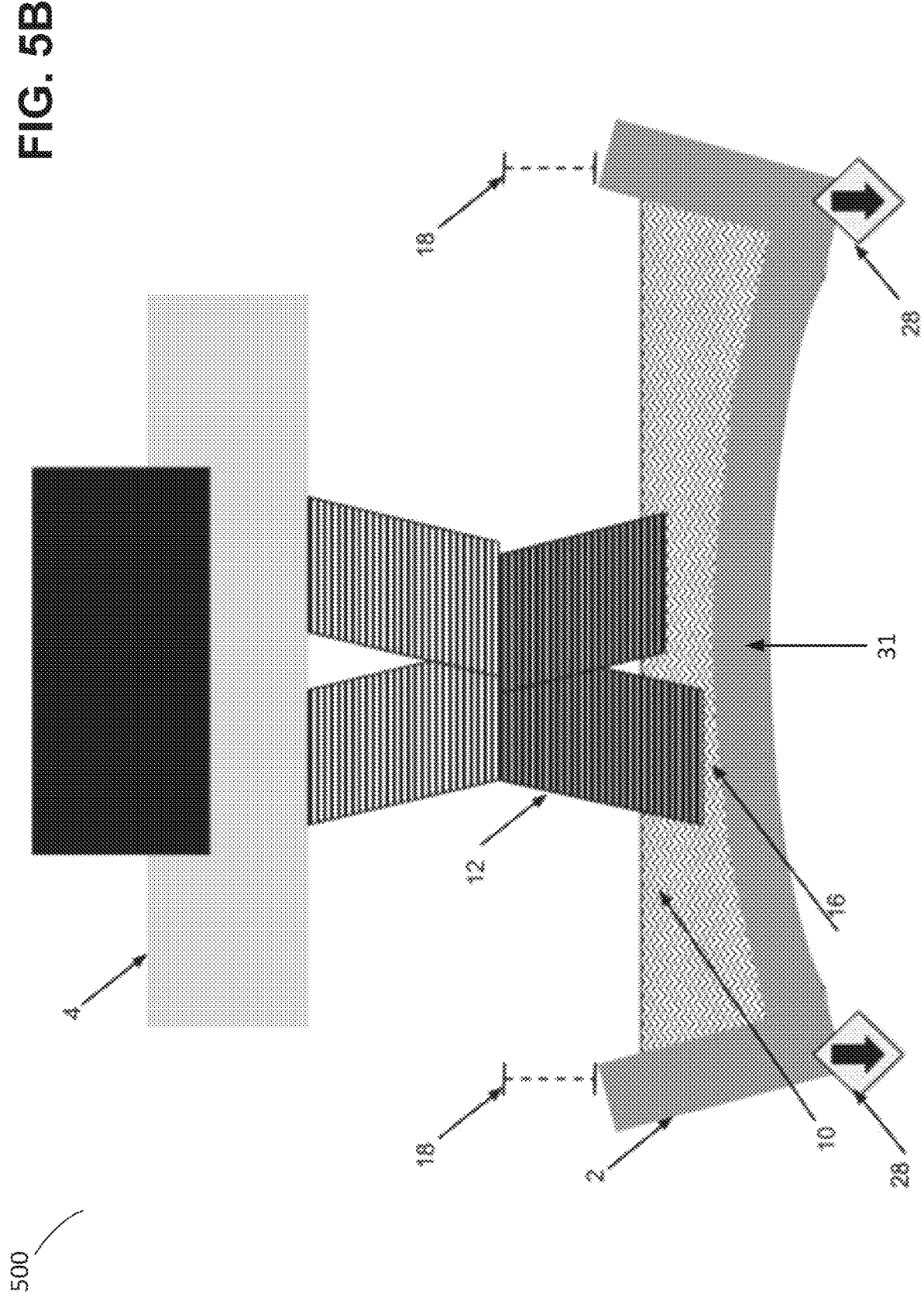

FIGS. 5A-B depict an alternate embodiment that addresses some of the proceeding issues, according to some embodiments. In the example of FIGS. 5A-B, a flexing force is applied to two or more sides of the flexible container 2 by two or more force generators 28 while keeping at least fixed point 31 held in place. In exemplary inverse stereolithographic printer 500, therefore, instead of having a fixed side of the container, the container has opposing forces on two or more sides along with one or more fixed points between the two sides that work in concert to bend the container in a concave manner across the container.

In some use cases, by applying a flexing force from two directions part peeling may be initiated at multiple locations. For example, the left and right sides of layer 14 may begin peeling independently of one another (at the same time, or at different times), and the final region of the layer to separate from the container may be located between the left and right sides of the layer. Once the part 12 and the most recently cured resin layer 14 are separated from the flexible resin container 2, the flexed sides of the resin container may return to their original position with the resin container parallel to the part 12 and the build platform 4. As the sides return to the original position, the upward motion replaces the layer of uncured resin 10 and the next layer of the build can progress. Each step of the aforementioned curing and peeling processes may continue until the part is fully created. Multiple peel sites may, in some use cases, work to reduce overall force needed, decrease distortion across the part by more evenly applying forces, and/or reduce peel time.

It will be appreciated that substantially the same result as shown in FIGS. 5A-B may equally be effected by keeping one or more points at the ends of the container fixed and applying a force between the ends in an upward direction while moving the build platform upward. As such, exemplary peeling processes that include bending of a container described here, including but not limited to those discussed in relation to FIGS. 4A-B and FIGS. 5A-B, may perform said bending in any suitable way such that the container bends relative to a part and/or build platform. It will be appreciated that, in general, such motion may be effected by any suitable combination of applying force to the container, keeping one or more points of the container fixed, rotating the container about an axis and/or moving the build platform, and that the particular examples discussed herein are simply illustrative of these techniques.

Figure 6A:
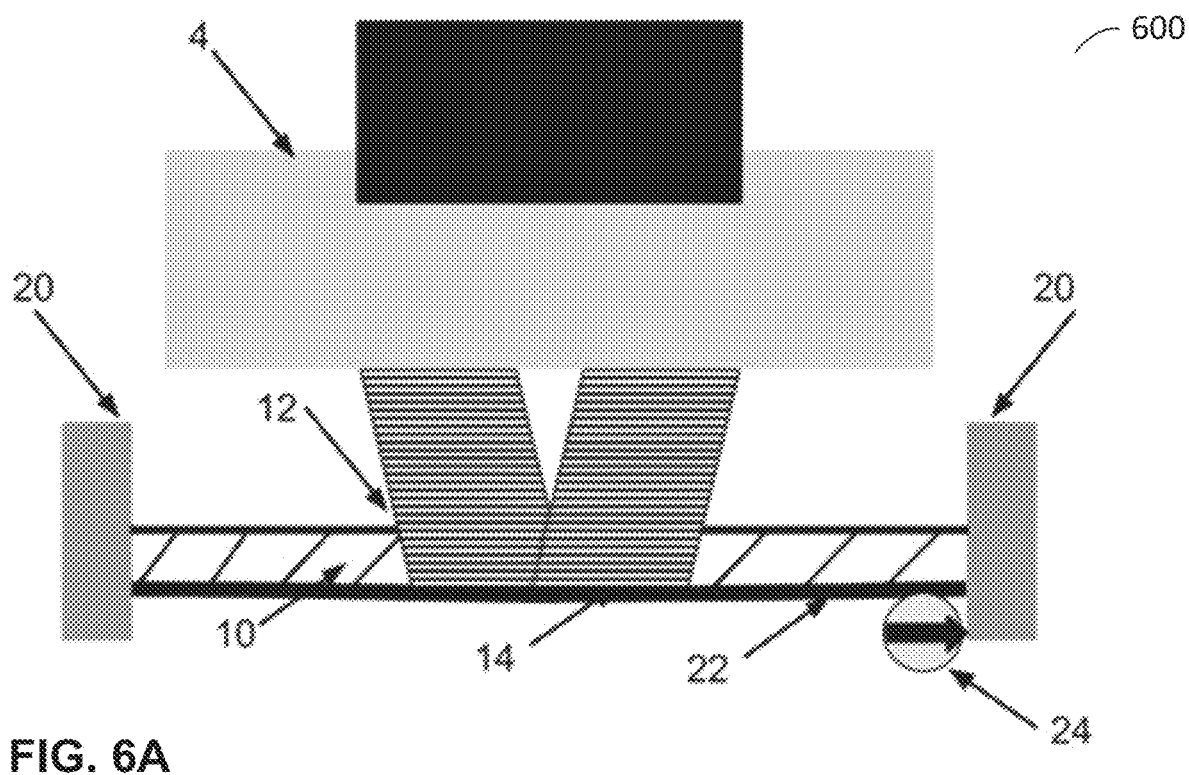
FIGS. 6A-C depict a stereolithographic printer utilizing a thin film, according to some embodiments.
Figure 6B:
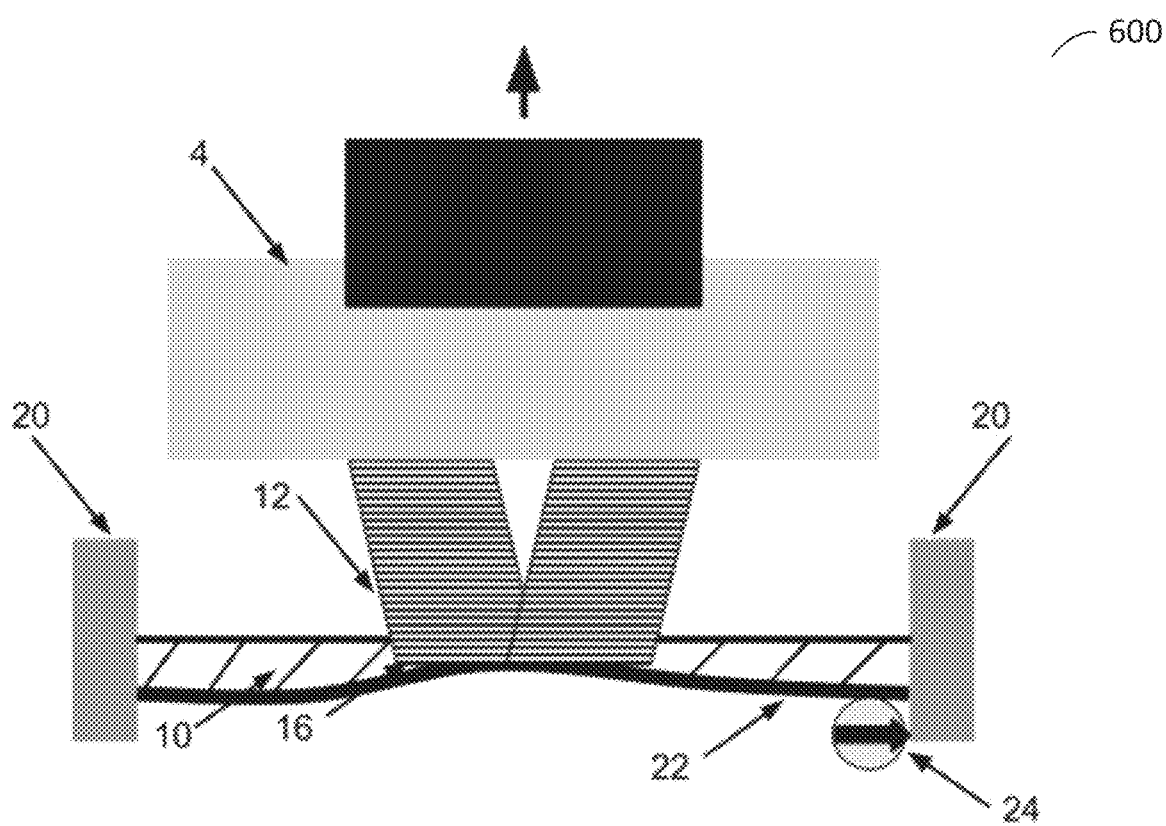
Figure 6C:
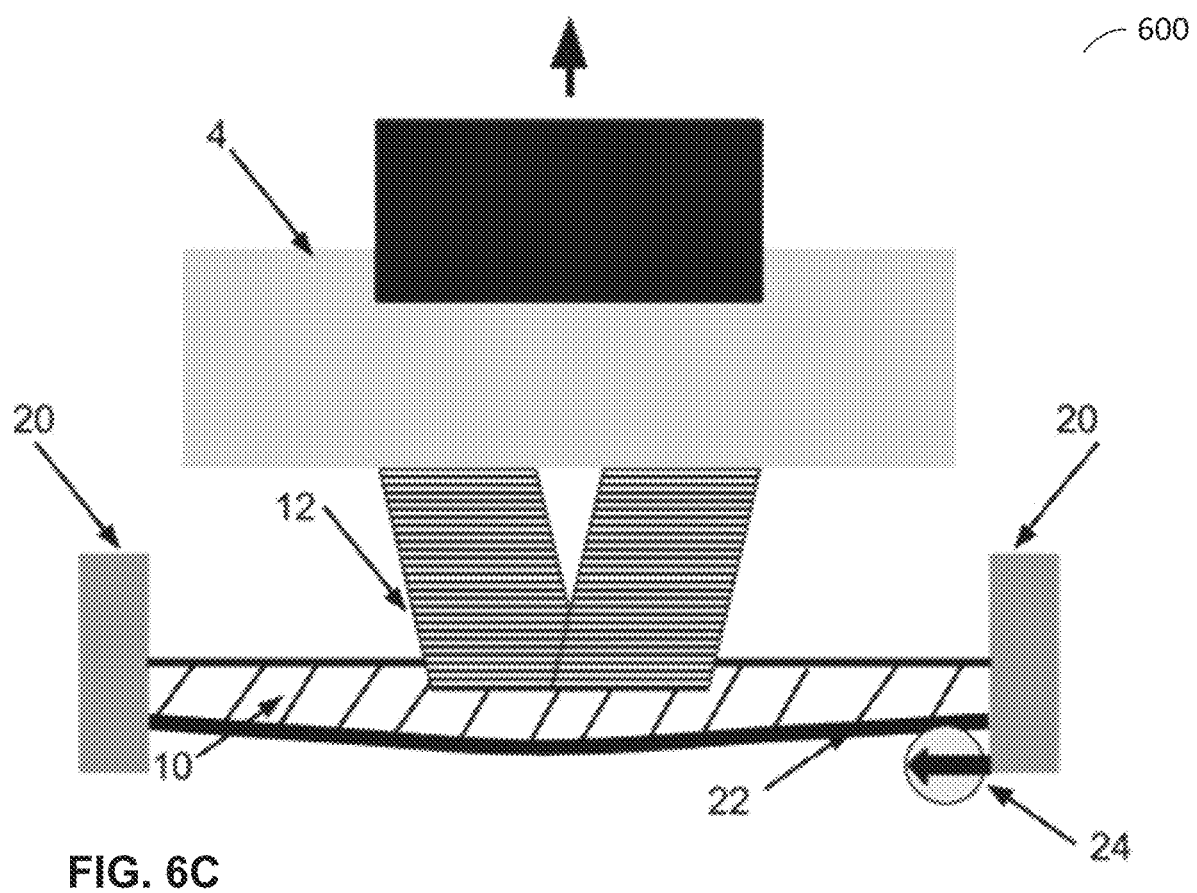

FIGS. 6A-C illustrate an exemplary additive fabrication device configured to separate a part from a surface using a flexible film, according to some embodiments. Exemplary additive fabrication device 600 includes a container formed from a thin film 22 and sides 20, which holds resin 10. Thin film 22 may comprise any highly flexible and/or non-reactive material, such as Teflon® (or any other polytetrafluoroethylene-based formula). The sides of the resin container 20 may be comprised of a more rigid material such as an acrylic. The film may have any suitable thickness such that the film is thick enough to maintain structural integrity through the fabrication process and is thin enough to be easily removed from the part as described herein. In some embodiments, the thin film has a thickness between 0.002" and 0.02". In some embodiments, the thin film has a thickness equal to or greater than 0.05" and less than or equal to 0.01". Thin film 22 may be fixed to the resin container sides 20 or may be adjustably tensioned between them. Exemplary additive fabrication device 600 includes a wiper 24, to be discussed below.

As shown in FIG. 6A, a layer of cured resin 14 of a part 12 may adhere to the flexible floor of the container 22 during the fabrication process. As shown in FIG. 6B, the build platform and part may be lifted upward with adhesion forces causing the film 22 to deform. The flexible film 22 is able to deflect upward with the part until the necessary separation force is generated by the upward movement of the part and the downward pull of the container floor. A mechanical peel 16 then begins at the outer edges of the part and propagates inward until the part is separated, as shown in FIG. 6C.

Using a flexible film layer as part or the entire floor of the container may decrease the overall force applied to the part by allowing the peeling edge to propagate inward from the entire outer edge rather than a discrete number of sides. In the example of FIGS. 6A-C, the flexibility of the resin container may be such that the floor of the resin container 22 behaves like a thin sheet, rather than like a flexible beam. This difference may be typified by the extent to which the floor of the resin container propagates beam loading forces across the floor of the container. Flexible resin containers described above (e.g., as relating to FIGS. 4A-B and 5A-B) may tend to propagate load across the entire floor of the container, thus deflecting globally across the layer in contact with the container. Using a film may result in the load being concentrated and minimally propagating deflection. With a highly elastic film layer, the adhesion force may be sufficient to deform the film layer and ensure the peel progresses gradually across the part. Further, a film layer 22 may reduce peel discrepancies based on part placement. Because each part peels independently with a localized peel, the placement of the part 12 relative to the container sides 20 may become less relevant.

Figure 7A:
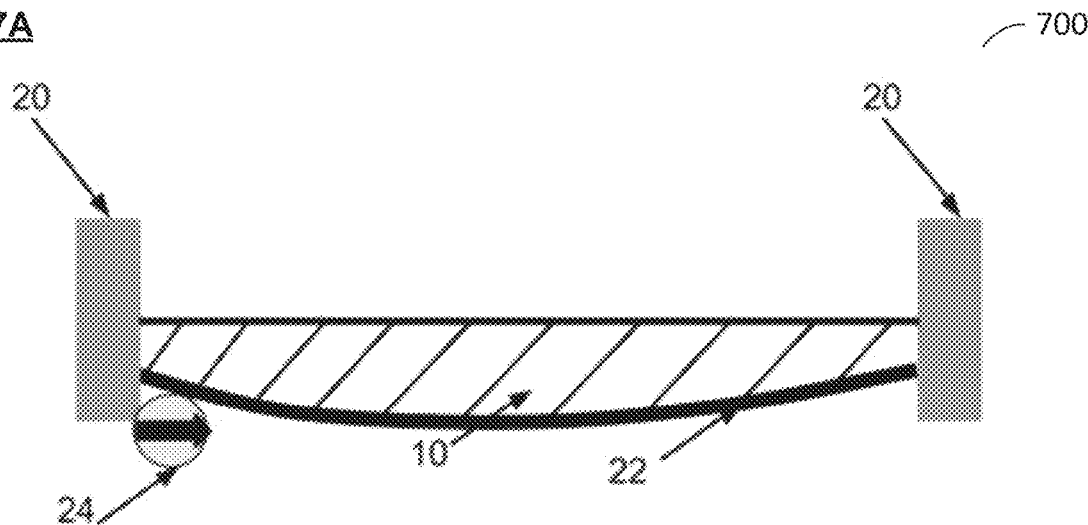
FIGS. 7A-C depict wiping of a thin film in a stereolithographic printer, according to some embodiments.
Figure 7B:
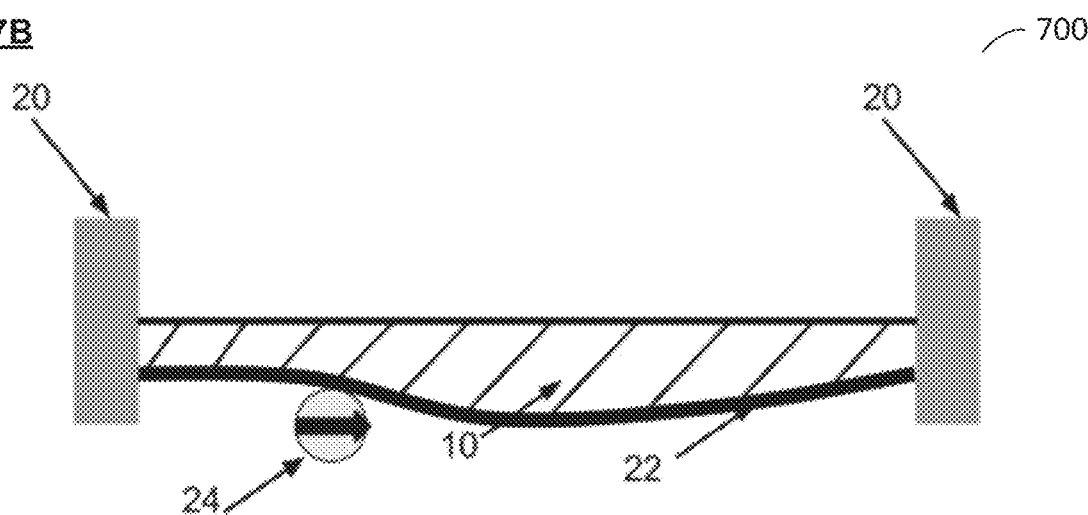
Figure 7C:
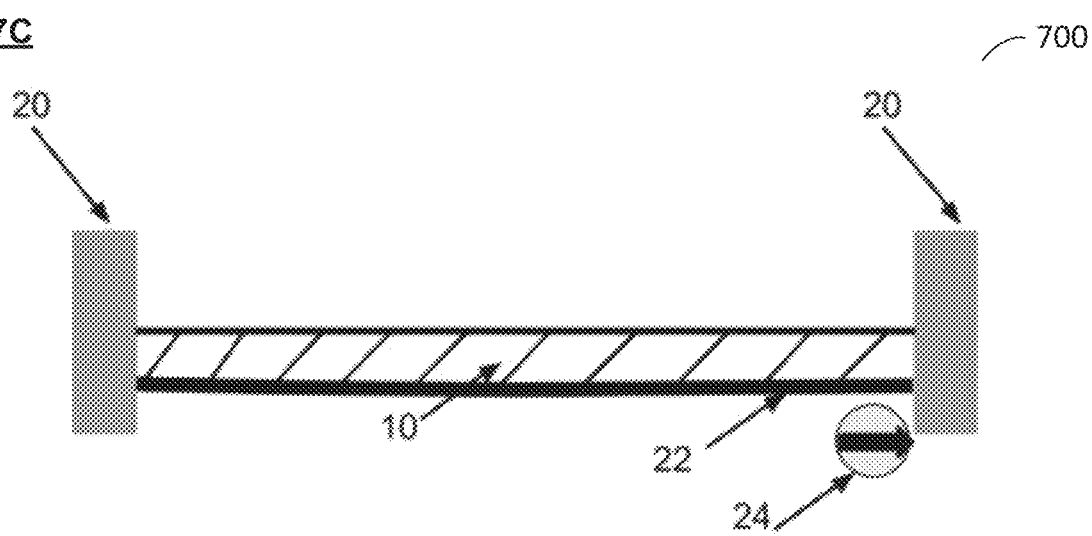

In some use cases, the use of a highly flexible film may result in the weight of resin and force of the build platform and part to cause unwanted "sagging" deformation in the film. Such sagging may partially addressed by the use of a wiper. FIGS. 7A-C depict the use of such a wiper 24 in exemplary container 700 having thin film 22, ends 20 and comprising resin 10. In the example of FIGS. 7A-C, the wiper lifts the film up towards the bottom of the part or build platform and so positions the film prior to each build layer to ensure a uniform thickness of resin between the build platform 4 and the resin tank floor 22.

As shown in the exemplary progression from FIG. 7A to FIG. 7B to FIG. 7C, the wiper may move from one side of the container to the other while pushing the sag out of the film until it is sufficiently parallel to the build platform 4 (see FIGS. 6A-C). The film floor may be held in place by suction forces between the container floor 22 and the build platform 4 or part 12. This suction may depend on the viscosity of the resin and/or on the size of a part currently being fabricated. While the wiper 24 is depicted as a cylindrical roller in FIG. 7, the wiper may be of any suitable shape and may progress across the film floor in any suitable way, such as from one side to the other as shown in FIGS. 7A-C, or in a coordinated pivoting motion like windshield wipers. Following this motion, a thickness of resin suitable for fabricating a layer of a part may be left between the film and either the build platform 4, or after fabrication has commenced, the part 12. In some embodiments, the wiper may proceed below the film such that it accelerates smoothly with minimal frictional forces. Moving the wiper too slowly could allow the film floor 22 to sag again behind the wiper, but moving the wiper too quickly may cause undesirable friction as the blade accelerates. In some embodiments, the wiper speed is between 65 mm/s and 75 mm/s.

In some embodiments, the viscosity of the resin and suction forces created between the build platform 4 and the floor of the container 22 are utilized to maintain the correct position of the film while the next layer is printed. However, in some use cases, such forces may be insufficient to hold the film in place. In such use cases, it may be advantageous to apply a further upward force 26 across the floor of the resin container as depicted in FIG. 8 to ensure the floor of the resin container 22 is parallel to the build platform when filled with resin and the weight of the part and build platform. In one embodiment, such force may be provided by introducing a pressure difference between the lower and upper (resin contacting) sides of the thin film. The pressure added may be sufficient to overcome the weight of the resin 10 and the film floor 22. Such a pressure difference may be provided through any suitable source, including standard atmospheric pumps, fans and/or compressed gas. In some embodiments, a pressure difference may be created by use of a fan placed at the outside of an enclosure located below the film. In some embodiments, the enclosure may be sealed to allow higher pressures to build. In some embodiments, pressure may be created using a standard computer fan, such as a Rosewill RFX-100 90 mm case fan.

Figure 9:
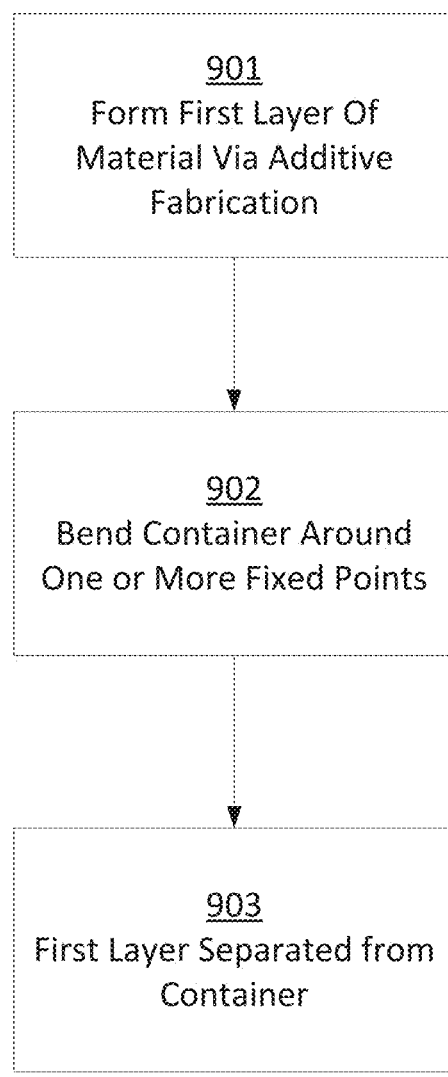
FIG. 9 illustrates a flow chart of a process suitable for separating a part from a surface during additive fabrication, according to some embodiments.

FIG. 9 illustrates a flow chart of a process suitable for separating a part from a surface during additive fabrication, according to some embodiments. Method 900 may be performed by any suitable additive fabrication apparatus, including but not limited to a stereolithographic printer as described above, for example in the exemplary embodiment shown in FIGS. 4A-B and/or FIGS. 5A-B.

In act 901, a first layer of material is formed via additive fabrication. The first layer of material may be formed at any time during additive fabrication of a part. For example, the first layer may be the sole layer formed (e.g., on a build platform), or may be the most recently formed layer and may be in contact with one or more previously formed layers.

In act 902, the container is bent around one or more fixed points. As discussed above, motion of any region of the container may be active or passive. In embodiments in which the container is bent via active means, the bending may be effected via one or more force generators, such as actuators. In act 902, bending the container causes at least the first layer of material to separate from the container via the peel operation described above, in act 903.

Figure 10:
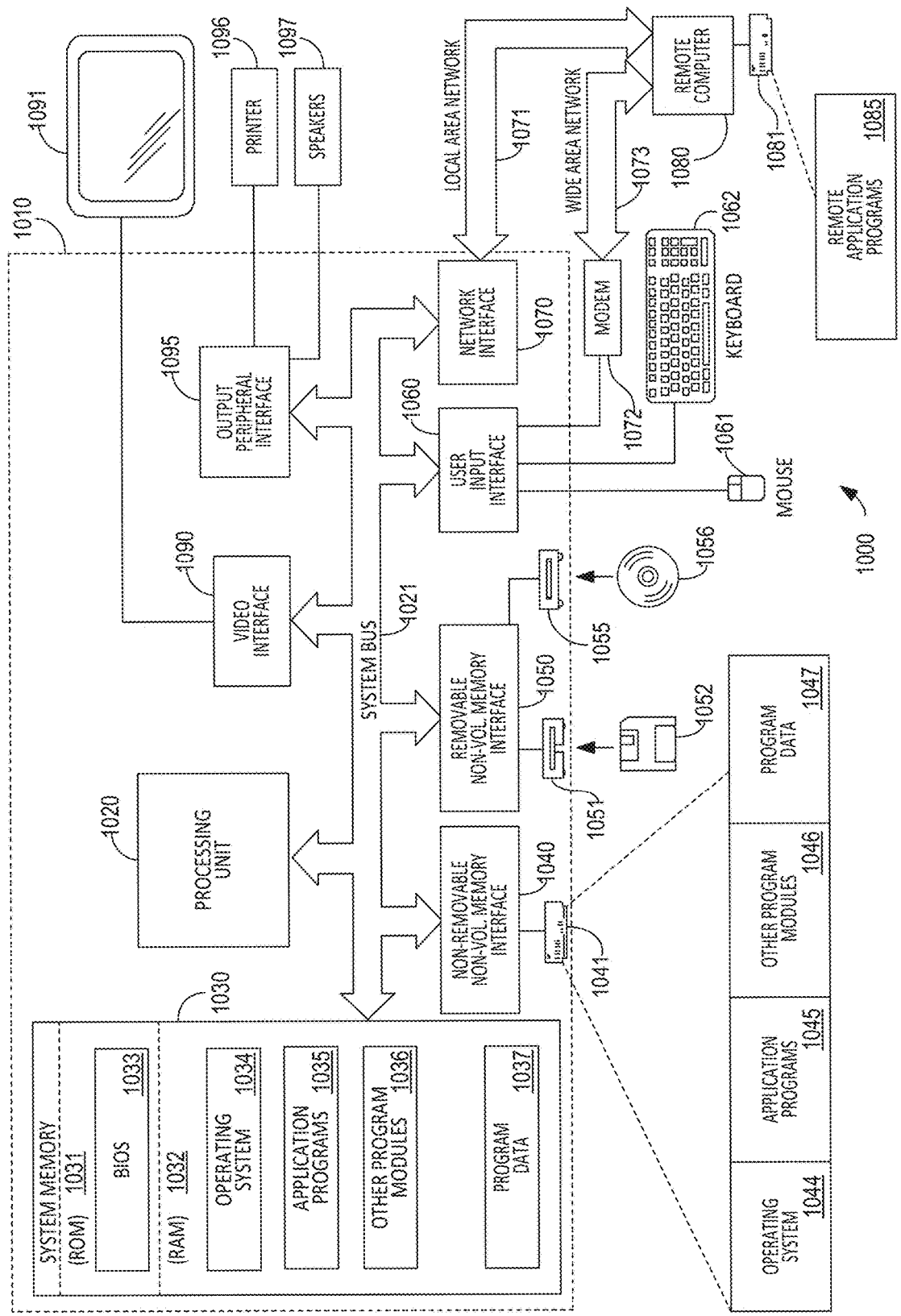
FIG. 10 illustrates an example of a computing system environment on which aspects of the invention may be implemented.

FIG. 10 illustrates an example of a suitable computing system environment 1000 on which aspects of the invention may be implemented. For example, the computing system environment 1000 may be used to instruct one or more force generators (e.g., actuators) to apply a force to one or more regions of a container, to move a build platform, to move a wiper, or any combinations thereof. Such a computing environment may represent a home computer, a tablet, a mobile device, a server and/or any another computing device.

The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

Aspects of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing aspects of the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through an non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through a output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. For example, the various methods or processes may utilize software to instruct a processor to activate one or more actuators to perform motions such as those described herein, such as motion of one or more regions of a container and/or of a build platform. Example of such approaches are described above. However, any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Various inventive concepts may be embodied as one or more methods, of which examples have been provided. For example, methods of separating a part from a surface during additive fabrication have been provided herein. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art.

For example, techniques of separating a portion of a part formed through additive fabrication from a surface were described. These techniques may be applied in other contexts. For example, any additive fabrication process in which a portion of a part being formed becomes in any way attached to a surface other than another portion of the part or a build platform may utilize techniques as described herein. Such modifications and improvements are intended to be within the spirit and scope of the invention. Accordingly, the foregoing description is by way of example only, and is not intended as limiting.

What is claimed is:

1. A method of additive fabrication wherein a plurality of layers of material are formed on a build platform, comprising:
    forming a layer of material in contact with a container; and
    operating, subsequent to the forming of the layer of material, one or more force generators coupled to the container to apply a force to a portion of the container, thereby actively bending the container away from the build platform, such that the layer of material separates from the container.

2. The method of claim 1, wherein bending the container around the at least one fixed point comprises moving at least a portion of the container while anchoring the container around at least one fixed point.

3. The method of claim 2, wherein the at least one fixed point includes a first end of the container.

4. The method of claim 3, wherein bending the container comprises moving a second end of the container away from the build platform.

5. The method of claim 2, wherein causing the layer of material to separate from the container comprises separating a first portion of the layer of material from the container prior to separating a second portion of the layer of material from the container.

6. The method of claim 5, wherein the at least one fixed point comprises a first fixed point, and wherein the second portion of the layer of material is closer to the first fixed point than the first portion of the layer of material.

7. The method of claim 1, further comprising moving the build platform such that the combined motion of the build platform and the bending of the container cause the layer of material to separate from the container.

8. The method of claim 2, wherein bending the container comprises moving ends of the container, and wherein the at least one fixed point includes one or more points between the ends of the container.

9. The method of claim 8, wherein causing the layer of material to separate from the container comprises separating a first portion of the layer of material at substantially the same time as a second portion of the layer of material, the first and second portions of the layer of material being non-contiguous.

10. The method of claim 1, further comprising moving the build platform relative to the container during operation of the one or more force generators.

11. The method of claim 1, wherein the container is formed from an acrylic plastic.

* * * * *